United States Patent [19]

Giles, Jr.

[11] 4,433,104

[45] Feb. 21, 1984

[54] POLYETHERIMIDE-FLUORINATED POLYOLEFIN BLENDS

[75] Inventor: Harold F. Giles, Jr., Cheshire, Mass.

[73] Assignee: General Electric Company, Pittsfield, Mass.

[21] Appl. No.: 359,260

[22] Filed: Mar. 18, 1982

[51] Int. Cl.$^3$ .............................................. C08L 29/08
[52] U.S. Cl. ...................................... 525/180; 525/184
[58] Field of Search ................................ 525/180, 184

[56] References Cited

U.S. PATENT DOCUMENTS

| | | | |
|---|---|---|---|
| 3,356,759 | 12/1967 | Gerow | 525/180 |
| 3,356,760 | 12/1967 | Matray | 525/180 |
| 3,668,193 | 6/1972 | King | 525/180 |
| 4,014,834 | 3/1977 | Concannon | 525/180 |
| 4,139,576 | 2/1979 | Yoshimura | 525/180 |
| 4,255,471 | 3/1981 | Boldebuck | 525/183 |

FOREIGN PATENT DOCUMENTS

| | | | |
|---|---|---|---|
| 55-18443 | 2/1980 | Japan | 525/184 |
| 1272301 | 1/1970 | United Kingdom | 525/184 |

*Primary Examiner*—Paul Lieberman
*Attorney, Agent, or Firm*—Bernard, Rothwell & Brown

[57] ABSTRACT

Disclosed are blends of (a) a polyetherimide and (b) a thermoplastic fluorinated polyolefin, or copolymer thereof. The blends have good flexural strength and flexural modulus and have a higher impact strength than those associated with the polyetherimide components of the blends.

9 Claims, No Drawings

POLYETHERIMIDE-FLUORINATED POLYOLEFIN BLENDS

This invention relates to a class of polyetherimide-fluorinated polyolefin blends. These blends have good flexural strength and flexural modulus and have a higher impact strength than those associated with the polyetherimide components of the blends.

The blends of the invention include a polyetherimide of the formula:

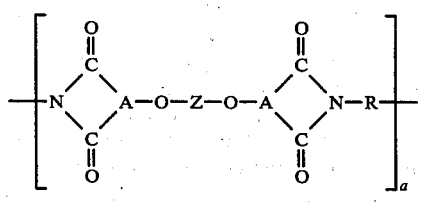

where a represents a whole number in excess of 1, e.g., 10 to 10,000 or more, the group —O—A< is selected from:

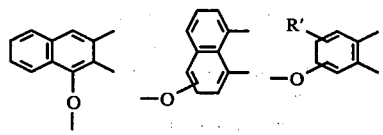

R' being hydrogen, lower alkyl or lower alkoxy, preferably the polyetherimide includes the latter —O—A< group where R' is hydrogen such that the polyetherimide is of the formula:

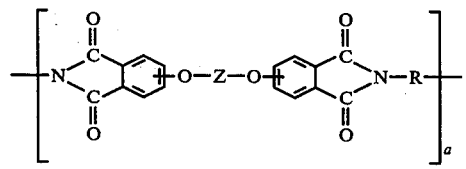

and the divalent bonds of the —O—Z—O— radical are in the 3,3'; 3,4'; 4,3' or the 4,4' position; Z is a member of the class consisting of (1)

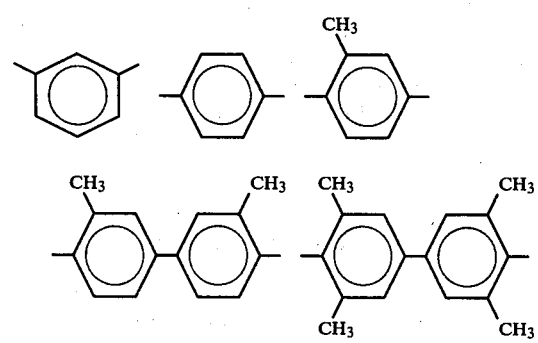

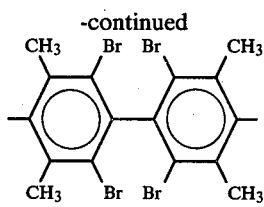

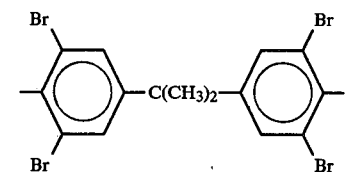

and (2) divalent organic radicals of the general formula:

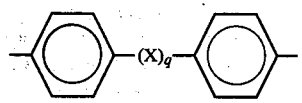

where X is a member selected from the class consisting of divalent radicals of the formulas,

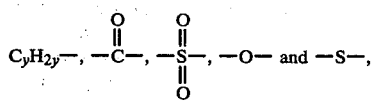

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

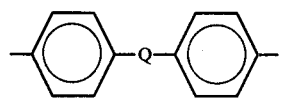

where Q is a member selected from the class consisting of

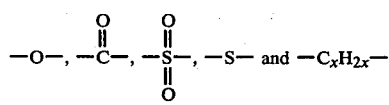

where x is a whole number from 1 to 5 inclusive. Particularly preferred polyetherimides for the purposes of the present invention includes those where —O—A< and Z respectively are:

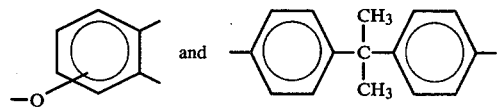

and R is selected from:

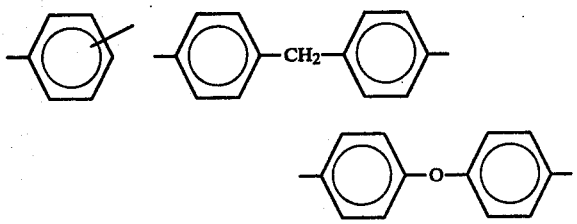

The polyetherimides where R is metaphenylene are most preferred.

As mentioned previously, blends of the invention also include a thermoplastic fluorinated polyolefin. Such thermoplastic fluorinated polyolefins generally have an essentially crystalline structure and have a melting point in excess of about 120° C. The fluorinated polyolefins are preferably a polymer of one or more fluorinated monomers containing ethylenic unsaturation and optionally one or more other compounds containing ethylenic unsaturation. The fluorinated monomer may be a perfluorinated monoolefin, for example hexafluoropropylene or tetrafluoroethylene, or a partially fluorinated monoolefin which may contain other substituents, e.g., chlorine or perfluoroalkoxy, for example vinylidene fluoride, chlorotrifluoroethylene and perfluoroalkyl vinyl ethers in which the alkyl group contains up to six carbon atoms, e.g., perfluoro (methyl vinyl ether). The monoolefin is preferably a straight or branched chain compound having a terminal ethylenic double bond and containing less than six carbon atoms, especially two or three carbon atoms. When units derived from monomers other than fluorine-containing monomers are present, the amount thereof is preferably less than 30 mole %, generally less than 15 mole %. Such other monomers include, for example, olefins containing less than six carbon atoms and having a terminal ethylenic double bond, especially ethylene and propylene.

Suitable fluorinated olefins include fluorinated polyethylenes of the structural formula:

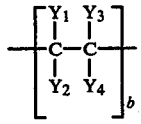

where b is an integer in excess of 50 and $Y_1$ to $Y_4$, which may be the same or different, are selected from the groups consisting of hydrogen, chlorine, bromine and fluorine, with the proviso that at least one of $Y_1$ to $Y_4$ is fluorine. Preferred fluorinated polyethylenes for the purposes of the present invention include poly(vinyl fluoride), poly(vinylidene fluoride), polytrifluoroethylene, polychlorotrifluoroethylene, polybromotrifluoroethylene, polytetrafluoroethylene, and copolymers thereof. A particularly preferred fluorinated polyethylene is polytetrafluoroethylene. Other suitable fluorinated polyolefins include polyperfluoropropane, perfluorobutadiene and polyhexafluoropropylene.

More specifically, polytetrafluoroethylenes are fully fluorinated polyethylenes of the basic chemical formula $(-CF_2-CF_2-)_n$ which contains about 76% by weight fluorine. These polymers are highly crystalline and have a crystalline melting point of over 300° C. Commercial polytetrafluoroethylenes are available from E. I. duPont de Nemours & Co., Inc. under the tradename Teflon and from Imperial Chemical I industries under the tradename Fluon. Polychlorotrifluoroethylene and polybromotrifluoroethylene are also available in high molecular weights and can be employed in blends of the instant invention.

Other preferred fluorinated polyethylenes are homopolymers and copolymers of vinylidene fluoride. Poly(vinylidene fluoride) homopolymers are the partially fluorinated polymers of the chemical formula $(-CH_2-CF_2-)_n$. These polymers are tough linear polymers with a crystalline melting point at 170° C. Commercial homopolymer is available from Pennwalt Chemicals Corporation under the tradename Kynar. The term "poly(vinylidene fluoride)" as used herein refers not only to the normally solid homopolymers of vinylidene fluoride, but also to the normally solid copolymers of vinylidene fluoride containing at least 50 mole percent of polymerized vinylidene fluoride units, preferably at least about 70 mole percent vinylidene fluoride and more preferably at least about 90% vinylidene fluoride units. Suitable comonomers are halogenated olefins containing up to 4 carbon atoms, for example, dichlorodifluoroethylene, vinyl fluoride, vinyl chloride, vinylidene chloride, perfluoropropene, perfluorobutadiene, chlorotrifluoroethylene, trichloroethylene, tetrafluoroethylene and the like. Commercially available fluorinated polyolefins of this class include copolymers of vinylidene fluoride and hexafluoropropylene such as Viton A, Viton A35 and Viton AHV sold by E. I. du Pont; copolymers of vinylidene fluoride, hexafluoropropylene and tetrafluoroethylene such as Viton B and Viton B50 sold by E. I. du Pont; and copolymers of vinylidene fluoride and chlorotrifluoroethylene such as Kel-F sold by Minnesota Mining and Manufacturing Co.

The polyetherimides can be obtained by any of the methods well known to those skilled in the art including the reaction of any aromatic bis(ether anhydrides) of the formula

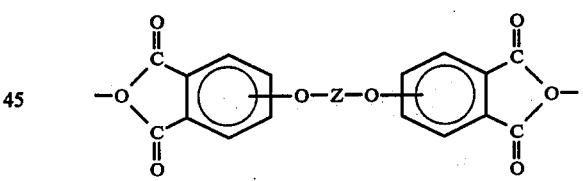

where Z is as defined hereinbefore with an organic diamine of the formula

where R is as defined hereinbefore.

Aromatic bis(ether anhydride)s of the above formula include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimenthylbenzidine, 3,3'-dimethoxybenzidine, 2,4-bis($\beta$-amino-t-butyl)toluene, bis(p-$\beta$-amino-t-butylphenyl)ether, bis(p-$\beta$-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylendediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [$\eta$] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. No. 3,847,867 Heath et al., Williams U.S. Pat. No. 3,847,869, Takekoshi et al. U.S. Pat. No. 3,850,885, White U.S. Pat. Nos. 3,852,242 and 3,885,178, etc. These disclosures are incorporated herein in their entirety by reference for the purpose of teaching, by way of illustration, general and specific methods for preparing polyetherimides suitable for the blends of this invention.

Generally, a great number of fluorinated polyolefins for use in the blends of the present invention are available commercially and methods for their preparation are well known to those of ordinary skill in the art. For example, methods of preparing fluorinated polyethylenes are set forth in the Kirk-Othmer Encyclopedia of Science and Technology, Vol. 9, pages 805–847 (1966) and the references cited therein and generally involve polymerization of gaseous monomer at moderate temperatures, e.g., 30°–100° C., and at elevated pressure, e.g., 2 to 600 atms. in the presence of an initiator or by emulsion polymerization using a free radical initiator. Further methods for making fluorinated polyolefins are described in U.S. Pat. Nos. 2,968,649, 3,051,677, 3,053,818, 3,069,401, 3,080,347, 3,707,529, and 3,845,024, which are incorporated herein by this reference.

In accordance with the present invention, blends of a polyetherimide and a fluorinated polyolefin are generally obtained in all proportions of the two polymers relative to each other. Consequently, blends comprising from about 1 to about 99% by weight, polyetherimide and from about 99 to about 1%, by weight, fluorinated polyolefin are included within the scope of the invention. By controlling the proportions of polyetherimide and fluorinated polyolefin relative to each other, blends having certain predetermined properties which are improved over those of either a polyetherimide or a fluorinated polyolefin alone are readily obtained. In general, blends of polyetherimides and fluorinated polyolefin preferably contain minor proportions of the fluorinated polyolefin, e.g. from about 0.5% up to about 30%, by weight, so as to maintain the high strength characteristics of the polyetherimide component of the blend while improving the impact strength for the blend.

It is contemplated that the polyetherimide-fluorinated polyolefin blends of the present invention may also include other additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more fluorinated polyolefins or two or more fluorinated polyolefins in combination with one or more polyetherimides.

Methods for forming polyetherimide-fluorinated polyolefin blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide-fluorinated polyolefins blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, coil and cable wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-fluorinated polyolefin blends can also serve in printed circuit applications.

Alternatively, solutions of the blends herein described can be coated on electrical conductors such as copper, aluminum, and the like and thereafter the coated conductor can be heated at elevated temperatures to remove the solvent and to form a continuous coating of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats or other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention such as by incorporating such fillers as asbestos, glass fibers, talc, quartz, powder, finely divided carbon, silica, and the like into the blends prior to molding. Shaped articles may be formed under heat, or under heat and pressure, in accordance with practices well known in the art.

The following examples illustrate specific polyetherimide-fluorinated polyolefin blends in accordance with the present invention. It should be understood that the examples are given for the purpose of illustration and do not limit the invention. In the examples, all parts and percentages are by weight unless otherwise specified.

EXAMPLE I

A polyetherimide-fluorinated polyolefin blend according to the invention was prepared, the blend molded into test specimens and the specimens tested for various physical properties.

The polyetherimide of the blend was prepared from the reaction product of essentially equimolar amounts of 2,2-bis[4-(3,4-dicarboxy phenoxy) phenyl]propane dianhydride and m-phenylene diamine produced at elevated temperature of about 250° to about 300° C. and under a nitrogen atmosphere. The polymer was extruded at about 300° C. to form a strand and mechanically chopped into pellets. A test specimen of the polyetherimide was injection molded from the pellets at a temperature of about 685°–700° F. The physical properties of the polyetherimide are set forth in the following Table.

The fluorinated polyolefin used was a polytetrafluoroethylene sold under the tradename Teflon DLX-6000 by E. I. duPont de Nemours & Co., Inc. About 85 parts of the above polyetherimide were mixed with about 15 parts of the polytetrafluoroethylene. The mixture of the two polymers was then extruded in a Werner & Pfleiderer extruder having a temperature profile varying from about 615° to 650° F. The resulting extrudate was comminuted into pellets and the pellets injection molded into test specimens in a Battenfield molding machine at a temperature of about 685° F. to 700° F. The impact strength of these specimens was measured according to the unnotched and notched Izod impact test and the results are set forth in the following Table. The heat deflection temperature and flexural properties of the blend were also determined and are given in the Table.

EXAMPLE II

The procedure of Example I was repeated with the exception that about 90 parts of polyetherimide were blended with about 10 parts of polytetrafluoroethylene to produce the blend according to the invention. The results of the unnotched and notched Izod impact test, as well as the heat deflection temperature, flexural strength and flexural modulus for the blend are detailed in the Table.

EXAMPLE III

The procedure of Example I was repeated with the exception that about 88 parts of polyetherimide were blended with about 12 parts of polytetrafluoroethylene and about 0.5% of an internal lubricant was included to produce the blend according to the invention. The internal lubricant used is sold under the tradename PCL-700 by Union Carbide. The results of the unnotched and notched Izod impact test, as well as the heat deflection temperature, flexural strength and flexural modulus for the blend are detailed in the Table.

TABLE

| Example | % polytetra-fluoroethylene | Izod Impact 3.2 mm bar (ft-lb/in) | | Heat Distortion Temperature (°F. at 264 psi) | Flexural Strength (psi 105) | Flexural Modulus (psi 105) |
| --- | --- | --- | --- | --- | --- | --- |
| | | notched | unnotched | | | |
| I | 0 | 1.1 | 26.5 | 186 | 5.02 | 2.10 |
| | 15 | 1.2 | 6.1 | 181 | 4.45 | 1.78 |
| II | 10 | 1.3 | 7.5 | 184 | 4.52 | 1.85 |
| III | 12 | 1.4 | 10.6 | 185 | 4.42 | 1.77 |
| | | | 6.2 | | | |

As is apparent from the above results, blends according to the invention having a minor proportion of fluorinated polyolefin exhibit good flexural properties and heat deflection temperature and an improved impact strength over the polyetherimide by itself.

Substitution of other polyetherimides and/or other fluorinated polyolefins for the polyetherimide and/or fluorinated polyolefins in the blends of the above examples may result in the formulation of polymer blends having similar characteristics.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) a fluorinated polyolefin or copolymer thereof and (b) a polyetherimide which has the formula:

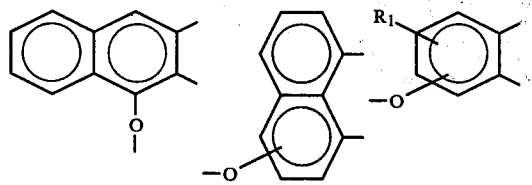

where a represents a whole number in excess of 1, the group —O—A< is selected from:

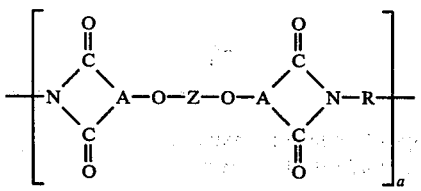

R' being hydrogen, lower alkyl or lower alkoxy, Z is a member of the class consisting of (1)

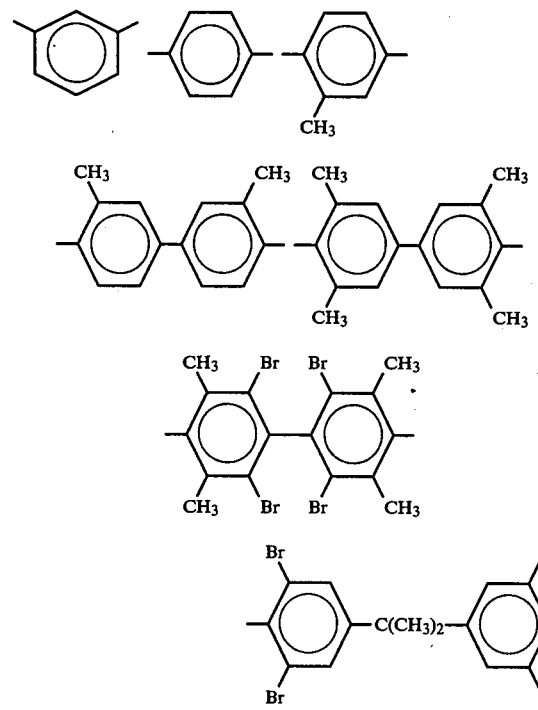

and (2) divalent organic radicals of the general formula:

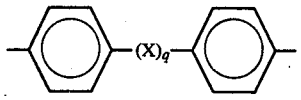

where X is a member selected from the class consisting of divalent radicals of the formulas,

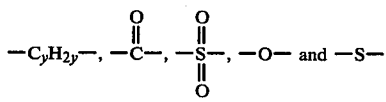

where q is 0 or 1, y is a whole number from 1 to 4, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

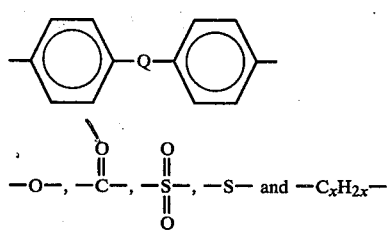

where x is a whole number from 1 to 5 inclusive.

2. A composition in accordance with claim 1 wherein the fluorinated polyolefin includes a fluorinated polyethylene.

3. A composition in accordance with claim 2 wherein the fluorinated polyethylene has the repeating structural formula:

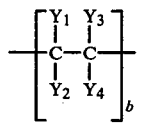

where b is an integer in excess of 50 and $Y_1$ to $Y_4$, which may be the same or different, are selected from the group consisting of hydrogen, chloride, bromine and fluorine, with the proviso that at least one of $Y_1$ to $Y_4$ is fluorine.

4. A composition in accordance with claim 3 wherein at least two of $Y_1$ to $Y_4$ are fluorine.

5. A composition in accordance with claim 4 wherein at least three of $Y_1$ to $Y_4$ are fluorine.

6. A composition in accordance with claim 5 where $Y_1$ to $Y_4$ are fluorine.

7. A composition in accordance with claim 1 wherein the polyetherimide is of the formula;

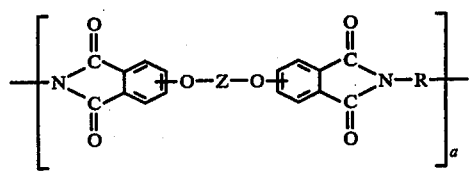
and the divalent bonds of —O—Z—O— radical are in the 3,3'; 3,4'; 4,3' or the 4,4' position.
8. A composition in accordance with claim 7 wherein Z is;
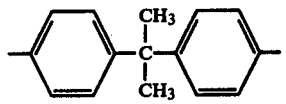
and R is selected from;
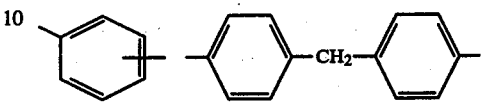
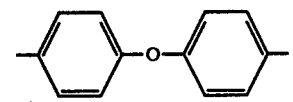
9. A composition in accordance with claim 8 wherein the polyetherimide is of the formula:
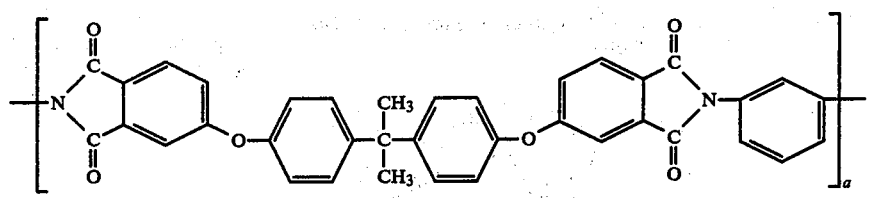
* * * * *

UNITED STATES PATENT AND TRADEMARK OFFICE
CERTIFICATE OF CORRECTION

PATENT NO. : 4,433,104

DATED : February 21, 1984

INVENTOR(S) : Harold F. Giles, Jr.

It is certified that error appears in the above-identified patent and that said Letters Patent is hereby corrected as shown below:

Column 6, line 10, "of" should read --for--.

Column 7, line 31, "or" should read --on--.

Column 10, line 32, insert the following: --where Q is a member selected from the class consisting of--.

Column 10, line 56, "chloride" should read --chlorine--.

Signed and Sealed this

Sixteenth Day of October 1984

[SEAL]

Attest:

Attesting Officer

GERALD J. MOSSINGHOFF

Commissioner of Patents and Trademarks